United States Patent [19]
d'Eon et al.

[11] Patent Number: 6,006,197
[45] Date of Patent: Dec. 21, 1999

[54] SYSTEM AND METHOD FOR ASSESSING EFFECTIVENESS OF INTERNET MARKETING CAMPAIGN

[75] Inventors: Christopher E. d'Eon, San Diego; Thomas B. Bolt, Encinitas, both of Calif.

[73] Assignee: StraightUp Software, Inc.

[21] Appl. No.: 09/062,877

[22] Filed: Apr. 20, 1998

[51] Int. Cl.[6] .................................................. H04N 1/413
[52] U.S. Cl. ................................ 705/10; 705/26; 705/7;
709/202; 709/205; 709/217; 709/229
[58] Field of Search ........................ 395/200.31, 200.33,
395/200.49; 705/7, 10

[56] References Cited

U.S. PATENT DOCUMENTS

| | | | |
|---|---|---|---|
| 5,347,632 | 9/1994 | Filepp et al. | 709/202 |
| 5,708,780 | 1/1998 | Levergood et al. | 709/229 |
| 5,710,884 | 1/1998 | Dedrick | 709/217 |
| 5,724,521 | 3/1998 | Dedrick | 705/26 |
| 5,812,776 | 9/1998 | Gifford | 709/217 |
| 5,870,546 | 2/1999 | Kirsch | 709/205 |
| 5,887,133 | 3/1999 | Brown et al. | 709/200 |
| 5,918,014 | 6/1999 | Robinson | 706/12 |

FOREIGN PATENT DOCUMENTS

0822535 A2  4/1998  European Pat. Off. ........ G09F 27/00

OTHER PUBLICATIONS

GeoCities Partners with StarPoint to Serve millions of Personalized Ads Daily, PR News Wire, Jul. 21, 1997.
Marketing and Selling on the Internet Unleashed by Broadvision; . . . ; Business Wire, Jan. 22, 1996.

Primary Examiner—Allen R. MacDonald
Assistant Examiner—Jagdish N Patel
Attorney, Agent, or Firm—John L. Rogitz

[57] ABSTRACT

A Web advertising measurement system that correlates the number of impressions of Web advertisements with post-impression transactional activity to measure the effectiveness of the advertisements. When a user clicks on a banner advertisement, an impression is established and the user's identification is recorded. Then, when the user undertakes post-impression transactional activity such as downloading software related to the advertisement, ordering products and services related to the advertisement, and so on, the transactional activity along with the user's identification is recorded. Based on the user identifications, the number of impressions associated with the advertisements are correlated to the post-impression transactional activity as a measure of effectiveness of each advertisement.

18 Claims, 3 Drawing Sheets

| BANNER (AD) # | "CLICKING" VISITOR (#) |
|---|---|
| 1 | 0001 |
| 1 | 0000 |
| 1 | 0002 |
| 2 | 0001  ← 42 |
| 2 | 0003 |
| 2 | 0004 |
| 3 | 0003 |

Fig. 3
VISITOR # VS. ADS CLICKED ON

| VISITOR # | DOWNLOAD (CHECK IF COMPLETED) /48 /46 |
|---|---|
| 0001 | ✓ |
| 0003 | ✓ |

Fig. 4
VISITOR # VS. DOWNLOADS

| VISITOR # | SUBSCRIBER /54 |
|---|---|
| 0001 | ✓ |

Fig. 5
VISITOR # SUBSCRIBERS (FROM SUBSCRIBER DB)

Fig. 6
OUTPUT

| AD # | # IMPRESSIONS /60 | #DOWNLOADS /58 /62 | #SUBSCRIBERS /64 |
|---|---|---|---|
| 1 | 3 | 1 | 1 |
| 2 | 3 | 0 | 0 |
| 3 | 1 | 1 | 0 |

SYSTEM AND METHOD FOR ASSESSING EFFECTIVENESS OF INTERNET MARKETING CAMPAIGN

FIELD OF THE INVENTION

The present invention relates generally to Internet marketing, and more particularly methods and apparatus for assessing the effectiveness of Internet advertisements.

BACKGROUND

Commerce over the portion of the Internet known as the World Wide Web, or "Web" for short, is growing. As part of the growth of Web commerce, advertisements on the Web are becoming more commonplace, sophisticated, and elaborate, and Internet advertising expense is expanding accordingly.

In advertising, consumers gain "impressions" of advertisements when they see the advertisement. As recognized by the present invention, to understand whether a particular advertisement is effective, it is important to know how many people gained an impression of the advertisement, and then to know how many subsequent sales or other transactions related to the advertisement resulted. The present invention further recognizes that as Internet advertising expands apace and more resources are spent on such advertising, it is desirable to assess the effectiveness of Internet advertisements, to more efficiently allocate Internet advertising resources.

In many Web applications, advertisements are presented as banners that are displayed prominently on a Web display, referred to as a Web page. If a user is attracted by the banner advertisement, the user can click on such a banner (i.e., by positioning a screen cursor on the banner and then depressing a button on a mouse or other input device). When the user clicks on the banner, an underlying "hyperlink" to another Web site that is associated with the banner, usually the home site of the advertiser, invokes a path to the advertiser's designated page. Typically, the name of the path is presented to the user in the form of a uniform resource listing ("URL"), such as "ABC_Inc.com", followed by a directory path designating the particular page in the site that the advertiser wishes to be displayed, such as "/directory$_{13}$ name/page_name".

In any case, when a user clicks on a banner advertisement, the user indicates that he or she has gained an "impression" of the advertisement. Because a single advertiser might use several banner advertisements that appear on various Web pages on the Internet, it is important for advertisers to correlate the number of times an advertiser's Web page is accessed from each banner, and then to correlate subsequent transactional activity to particular banners, so that it can be ascertained which banners are and are not effective in causing a user to make a transactional decision.

As still further recognized herein, an advertiser's Web site can include product or service order forms. Or, the Web site might enable the user to download computer software necessary for an online service, and/or to directly order the service or products, all of which information should ideally be correlated to advertising when appropriate. Accordingly, the present invention recognizes the desirability of correlating potentially many types of transactions to user impressions of advertising.

It unfortunately happens that current methods for tracking users around the Web cannot adequately render the information discussed above that is sought by advertisers. More specifically, one method of tracking users—depositing a software "cookie" on the user's browser—requires the intrusive if transparent downloading of an unasked—for piece of software onto the user's computer system to identify the user whenever the user accesses the cookie-depositing site. Moreover, users can erase or disable "cookies", rendering longitudinal tracking of such users problematic.

Users can also be tracked by recording the user identifications that are unique to each computer that directly accesses the Internet. However, in the case of groups of users who might collectively use a single proxy server to gain access to the Web for, e.g., security reasons, only the user identification of the proxy server is discoverable. In contrast, the user identifications of the potentially thousands of individual user computers served by the proxy server are not easily discoverable. It will readily be appreciated that as a consequence, subsequent transactional activity undertaken by individual users served by the proxy server cannot be correlated with certainty to the banner advertisements that attracted the individual users.

Moreover, because post-impression transactional activity might be undertaken off-line, the principles disclosed herein recognize the importance of using both online and off-line information to gain an important understanding of Internet advertising effectiveness. In light of the above discussion, it will be appreciated that such an understanding becomes ever more important in the burgeoning world of electronic commerce.

Accordingly, it is an object of the present invention to provide a system and method for assessing the effectiveness of Internet advertising. Another object of the present invention is to provide a system and method for assessing the effectiveness of Internet advertising that can be used with conventional Web page formats. Still another object of the present invention is to provide a system and method for assessing the effectiveness of Internet advertising that automatically correlates buyer interactions on the World Wide Web with a seller's in house marketing data. Yet another object of the present invention is to provide a system and method for assessing the effectiveness of Internet advertising that is easy to use and cost-effective.

SUMMARY OF THE INVENTION

A computer-implemented method is disclosed for indicating the effectiveness of at least one advertisement on at least one site on a wide area computer network. The method includes associating the advertisement with an advertisement identification, and including the advertisement identification in a first network path name. Then, the method includes receiving the first network path name when a user clicks on the advertisement, and in response thereto, returning to the user a second network path name including a visitor identification. Next, the method includes correlating the advertisement identification with the visitor identification.

Preferably, the advertisement identification and visitor identification do not identify any part of a network path. From a different view, the advertisement identification and visitor identification represent tracking information that is inserted in the path name of a virtual directory. In a particularly preferred embodiment the advertisement identification is stripped from the first path name and replaced with the visitor identification to thereby render the second path name.

As disclosed in detail below, the present method further includes associating visitor identifications to subsequent transactional activity relating to products or services promoted by the one or more advertisements. Also, for at least one of the advertisements and based on the visitor identifications, the subsequent activity is correlated to a number of impressions associated with the advertisement as an indication of the effectiveness of the advertisement.

In a preferred embodiment, the subsequent transactional activity includes one or more of: purchasing products or services advertised by the advertisements, initiating and/or completing a computer software download from the site, and cancelling purchases of products or services advertised by the one or more advertisements. Preferably, an average revenue value is correlated to the number of impressions associated with the advertisement, and an advertisement cost value is correlated to the number of impressions associated with the advertisement, as indications of the effectiveness of the advertisement.

In another aspect, a computer program product includes a computer program storage device readable by a digital processing system and logic means on the program storage device. The logic means include instructions executable by the digital processing system for performing method steps for assessing the effectiveness of advertising on a wide area computer network. The method steps undertaken by the logic means include recording the number of times user computers of the network access one or more advertisements on one or more sites on the network, with a respective impression being established when a user computer accesses an advertisement. The method also includes associating at least one respective user identification with at least one of the impressions, and then associating user identifications to subsequent transactional activity relating to products or services promoted by the one or more advertisements. For at least one of the advertisements and based on the user identifications, the subsequent activity is correlated to a number of impressions associated with the advertisement as an indication of the effectiveness of the advertisement.

In still another aspect, a system for indicating the effectiveness of at least one advertisement on at least one site on a wide area computer network includes logic means for determining, by user identification, when user computers of the network gain impressions of the advertisement. The system further includes logic means for using user identifications to correlate impressions of the advertisement to post-impression transactional activity undertaken by the user computers as an indication of the effectiveness of the advertisements.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a table showing the correlation of advertisement impressions by visitor identification;

FIG. 4 is a table showing the correlation of software downloads by visitor identification;

FIG. 5 is a table showing the correlation of service subscribers by visitor identification; and FIG. 6 is an exemplary output table.

DETAILED DESCRIPTION OF THE PREFERRED EMBODIMENT

Figure 1:
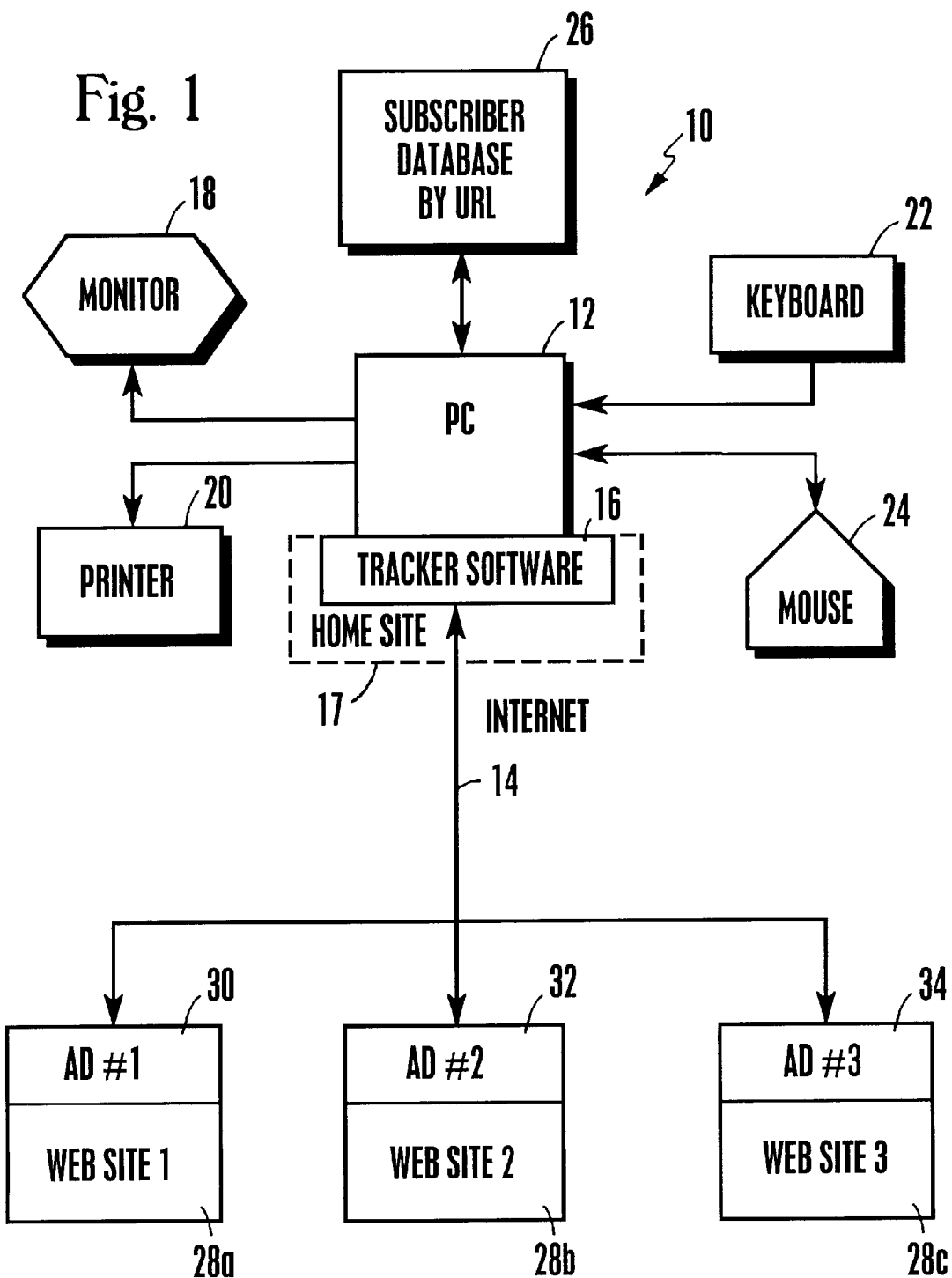
FIG. 1 is a schematic diagram of the computer file back up system of the present invention.

Referring initially to FIG. 1, a system is shown, generally designated 10, which includes a digital processing apparatus such as a laptop computer or personal computer (PC) 12. The PC 12 is part of a wide area computer network 14 such as the Internet and which communicates therewith in accordance with conventional principles. As shown in FIG. 1, the PC 12 accesses a tracker module 16 that functions in consonance with the novel logic described below to provide tools for assessing the effectiveness of advertising on the Internet. It is to be understood that the tracker module 16 can reside partially or completely on the advertiser's home Web site 17, and partially on the PC 12.

Additionally, the PC 12 can be associated with output devices such as a video monitor 18 and a printer 20. Also, the PC 12 can be associated with input devices such as a keyboard 22 and a mouse 24 or other pointing and moving device with which a user can initiate "clicks".

In one exemplary embodiment, the system 10 advertises computer backup services that are performed using the Internet. Accordingly, the system 10 can access a database 26 that contains the names of subscribers to the backup service, and can also contain user identification information such as the subscribers' visitor identifications discussed below or other addresses.

FIG. 1 schematically shows that the PC 12 can access one or more sites 28a–c on the portion of the Internet known as the World Wide Web. The sites 28a–c can present one or more banner advertisements 30, 32, 34. When one of the advertisements 30, 32, 34 is clicked on by a user to, e.g., hyperlink to a the site of the advertiser represented by the advertisement 30, 32, 34, the tracker software 16 undertakes the inventive method steps disclosed herein to unobtrusively track the user around the advertiser's site, thereby correlating the banner advertisement 30, 32, 34 clicked on to subsequent transactional activity.

The Figures illustrate the structure of the tracker module 16 of the present invention as embodied in computer program software. Those skilled in the art will appreciate that the Figures illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown in the Figures.

These instructions may reside on a program storage device including a data storage medium to establish a computer program product, such as a programmed computer diskette. Alternatively, such media can also be found in semiconductor devices, on magnetic tape, on optical disks, on a DASD array, on a conventional hard disk drive, on electronic read-only memory or on electronic random access memory, or other appropriate data storage device. In an illustrative embodiment of the invention, the logic means are computer-executable instructions that are written in $C^{++}$ language code.

Figure 2:
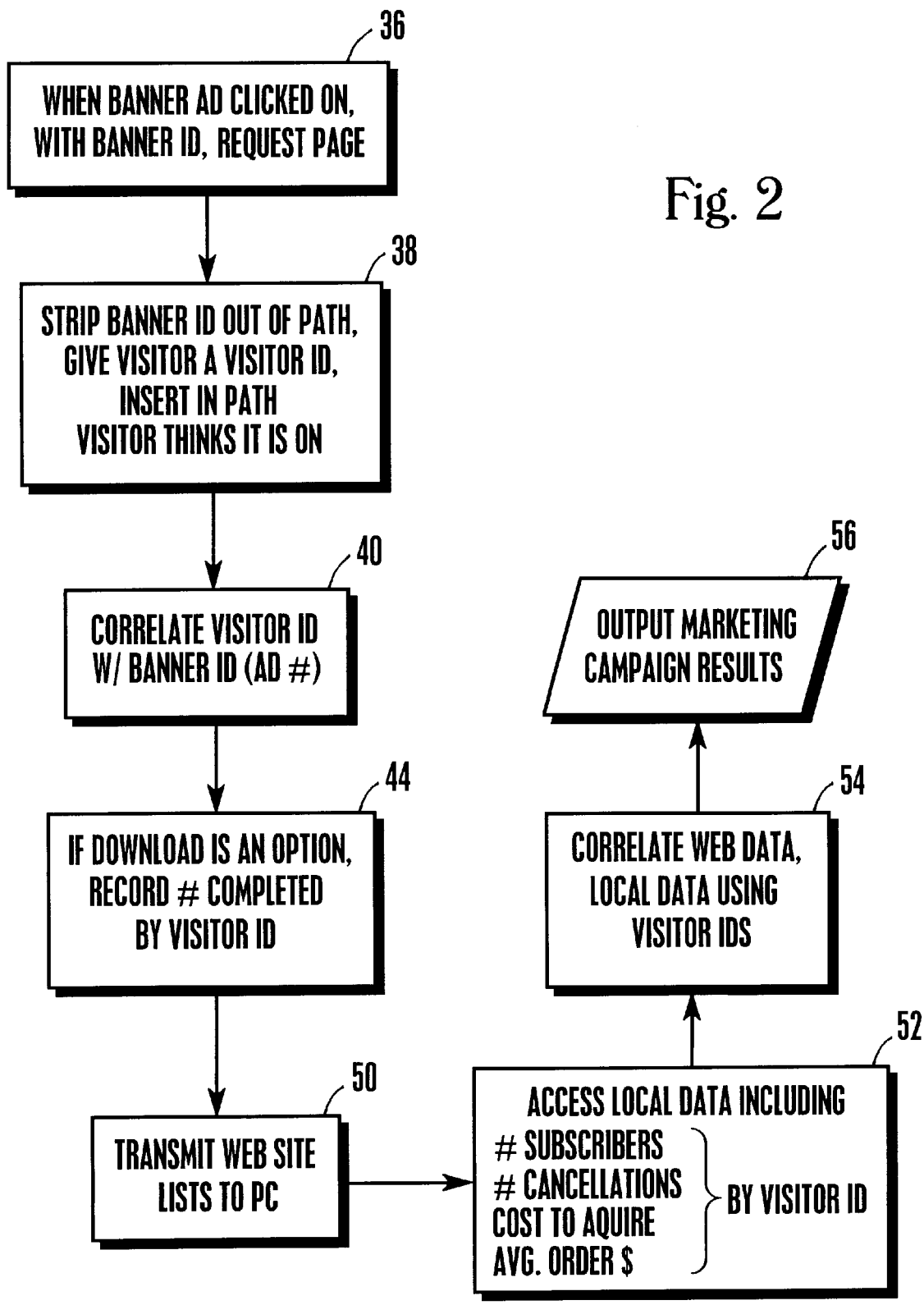
FIG. 2 is a flow chart of the present logic.

Referring now to FIG. 2, the present logic can be understood. The process begins at block 36, wherein a user clicks on one of the banner advertisements 30, 32, 34. In response, a network path name is invoked to hyperlink the user to a Web page associated with the advertisement 30, 32, 34. In accordance with the present invention, the network path name that is invoked is a conventional network path name including a URL followed by a directory path name, with the following exception. In the directory path name, an advertisement identification has been inserted. Thus, for example, the network path name might appear thusly: "atbackup.com/ ad_ID/security.html", wherein the term "ad_ID" is the advertisement identification. It is to be understood that the advertisement identification in the network name underlying the advertisement is pre-correlated to the advertisement, with each advertisement 30, 32, 34 having its own unique advertisement identification.

The user sends this path name to the advertiser's Web site 17, requesting the designated page. Importantly, however, the tracker module 16 causes the advertisement identification to be ignored in rendering the requested page. In other words, the advertisement identification is part of a virtual network path; it represents no part of an actual path.

This is shown at block 38 in FIG. 2, wherein the advertisement identification is removed from the network path name, and a visitor identification unique to the requesting user is assigned to the user by inserting the visitor identification into the path name in place of the advertisement identification. The new network path name might appear thusly: "atbackup.com/visitor_ID/security.html", wherein the term "visitor_ID" is the visitor identification.

Then, the requested page from the home site 17 is sent to the user, along with the new network path name containing the visitor identification. Like the advertisement identification, however, the visitor identification is part of a virtual network path; it does not identify any part of an actual network path. Nevertheless, the user computer records the visitor identification as being part of the path name to the requested Web page, and thereafter transmits this visitor identification as part of the network path name as the user computer navigates around the home Web site 17, potentially undertaking various transactions. Preferably, the sending of the requested page, like the other actions undertaken by the tracker module 16, are time stamped.

Next, at block 40 the advertisement identification, although being ignored as part of an actual network path, nonetheless is buffered and then correlated with the visitor identification inserted at block 38. It may now be appreciated that the tracker module 16 records the identifications of users, as represented by the visitor identifications, who click on the advertisements 30, 32, 34. Each time a user clicks on one of the advertisements 30, 32, 34, an "impression" of the clicked-on advertisement by visitor identification is thereby established and recorded.

Thus, in recording the impressions, the module 16 records not only the particular advertisement 30, 32, 34 clicked on by its identification, but also the unique visitor identification of the accessing computer that has been correlated with the advertisement identification.

Accordingly, at block 40 user identifications in the particular form of visitor identifications are associated with impressions.

FIG. 3 illustrates the result of the step at block 40. In FIG. 3, a table 42 lists, by advertisement identification, the advertisements 30, 32, 34 clicked on, along with the visitor identification of the accessing user.

Proceeding to block 44, certain Web site-related transactional activity can be recorded by the to tracker 16. In the exemplary embodiment shown, it is possible for a user to download software from the home Web site 17 by, e.g., clicking on a download button displayed by the site 17.

Accordingly, at block 44 both software downloads initiated and software downloads completed are recorded by the tracker 16 and associated with the corresponding visitor identifications of the users downloading the software, which, it will be recalled, are transmitted as part of the network path name during downloading. Thus, at block 44 visitor identifications are associated with post-impression transactional activity relating to products or services promoted by the advertisements 30, 32, 34.

FIG. 4 illustrates the result of the step at block 44. In FIG. 4, a table 46 lists, by the identifications of the accessing users, software downloads initiated. If the download is completed, a virtual check mark or other appropriate mark or annotation can be made in a completion column 48 of the table 46.

From block 44 the process moves to block 50, wherein a person can appropriately manipulate one of the input devices 22, 24 shown in FIG. 1 to cause the PC 12 to request and receive the data compiled by the tracker module 16. In the preferred embodiment, the tables 42, 46 are transmitted to the PC 12 at block 50.

After receiving the Web site data at block 50, at block 52 the PC 12 can access local data pertaining to transactional activity related to the advertisements 30, 32, 34. For example, the PC 12 can access the subscriber database 26 for a list of subscribers. This list will contain, e.g., the subscribers' email addresses. These addresses can be correlated to the visitor identifications when, for example, a user registers online for a service or for software by filling his email address on a form and then causing this form to be transmitted using the network path name that contains the user's visitor identification. In this way, the user's email address is correlated to her unique visitor identification by the tracker module 16. Subsequent off-line ordering of products or services will require the user to include the user's email address for subsequent correlation of the email address to the corresponding visitor identification. It is to be consequently appreciated that the database 26 contains records of the purchase of services advertised by the advertisements 30, 32, 34.

FIG. 5 shows an example table 54 of such a list. Moreover, additional local data that is correlated to user identifications can be accessed at block 52, including subscriber cancellations, costs to acquire subscribers, and average order value for each subscriber. Thus, block 52 visitor identifications are associated with post-impression transactional activity relating to products or services promoted by the advertisements 30, 32, 34.

In accordance with the present invention, after collecting the Web site 17 data and local data as described above, the logic moves to block 54 to correlate the data using the visitor identifications to combine the data in the tables 42, 46, 54 shown in FIGS. 3–5. In other words, at block 54 based on the visitor identifications, post-impression transactional activity is correlated to the number of impressions associated with each advertisement 30, 32, 34 as an indication of the effectiveness of the advertisements 30, 32, 34. The resulting marketing campaign outcome is output via, e.g., the monitor 18, printer 20, or some other output device at state 56.

FIG. 6 shows a table 58 that exemplifies the marketing campaign outcome which is output at state 56. As shown, each advertisement 30, 32, 34 establishes a row in the table, and juxtaposed with the advertisement identification is an impression column 60 denoting the number of impressions for each advertisement 30, 32, 34 as obtained from the table 42 shown in FIG. 3. Also, next to the impression column 60 are transactional activity columns 62, 64 that respectively denote the number of software downloads per advertisement as obtained from the table 46 shown in FIG. 4, and the number of subscribers per advertisement as obtained from the table 54 shown in FIG. 5. The skilled artisan will appreciate that the number of software downloads per advertisement and the number of subscribers per advertisement are inferred by noting visitor identifications that have been associated both with impressions, using the advertisement identifications, and with post-impression transactional activities.

It is to be understood that further post-impression transactional activity columns can be provided in the table 58 shown in FIG. 6. For example, columns can be displayed that show the number of cancellations per advertisement, the cost to acquire a user per advertisement, the average revenue value for each user order per advertisement, or other desired post-impression indication of the effectiveness of each advertisement 30, 32, 34.

While the particular SYSTEM AND METHOD FOR ASSESSING EFFECTIVENESS OF INTERNET MARKETING CAMPAIGN as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

What is claimed is:

1. A computer-implemented method for indicating the effectiveness of at least one advertisement on at least one site on a wide area computer network, comprising the steps of:
    associating the advertisement with an advertisement identification;
    including the advertisement identification in a first network path name;
    receiving the first network path name;
    in response to the receiving step, returning to a user a second network path name including a visitor identification; and
    correlating the advertisement identification with the visitor identification, wherein the advertisement identification is removed from the first path name and replaced with the visitor identification to thereby render the second path name.

2. The computer-implemented method of claim 1, wherein the advertisement identification does not identify any part of a network path, and wherein the visitor identification does not identify any part of a network path.

3. The computer-implemented method of claim 1, further comprising the steps of:
    associating visitor identifications to subsequent transactional activity relating to products or services promoted by the one or more advertisements; and
    for at least one of the advertisements and based on the visitor identifications, correlating the subsequent activity to a number of impressions associated with the advertisement as an indication of the effectiveness of the advertisement.

4. The computer-implemented method of claim 3, wherein the subsequent activity relating to products or services promoted by the one or more advertisements includes purchasing products or services advertised by the one or more advertisements.

5. The computer-implemented method of claim 4, wherein the subsequent activity relating to products or services promoted by the one or more advertisements includes initiating a computer software download from the one or more sites on the network.

6. The computer-implemented method of claim 5, wherein the subsequent activity relating to products or services promoted by the one or more advertisements includes completing a computer software download from the one or more sites on the network.

7. The computer-implemented method of claim 6, wherein the subsequent activity relating to products or services promoted by the one or more advertisements includes cancellations of purchases of products or services advertised by the one or more advertisements.

8. The computer-implemented method of claim 7, wherein the correlating step further includes correlating an average revenue value to the number of impressions associated with the advertisement as an indication of the effectiveness of the advertisement.

9. The computer-implemented method of claim 8, wherein the correlating step further includes correlating an advertisement cost value to the number of impressions associated with the advertisement as an indication of the effectiveness of the advertisement.

10. A computer program product comprising:
    a computer program storage device readable by a digital processing system; and
    logic means on the program storage device and including instructions executable by the digital processing system for performing method steps for assessing the effectiveness of advertising on a wide area computer network, the method steps comprising:
    (a) recording the number of times user computers of the network select one or more advertisements on one or more sites on the network, a respective impression being established when a user computer selects an advertisement;
    (b) associating at least one respective user identification with at least one of the impressions;
    (c) associating user identifications to subsequent transactional activity relating to products or services promoted by the one or more advertisements; and
    (d) for at least one of the advertisements and based on the user identifications, correlating the subsequent activity to a number of impressions associated with the advertisement as an indication of the effectiveness of the advertisement.

11. The computer program product of claim 10, wherein the recording and associating steps are accomplished at least in part by receiving from the user a first network path name including an advertisement identification and returning to the user a second network path name including a visitor identification, the visitor identification establishing the user identification.

12. The computer program product of claim 11, wherein the advertisement identification is stripped from the first network path name and replaced with the visitor identification to thereby render the second network path name.

13. The computer program product of claim 12, wherein the subsequent activity relating to products or services promoted by the one or more advertisements includes at least one of: purchasing products or services advertised by the one or more advertisements; initiating a computer software download from the one or more sites on the network; completing a computer software download from the one or more sites on the network; and cancellations of purchases of products or services advertised by the one or more advertisements.

14. The computer program product of claim 13, wherein the correlating step further includes at least one of: correlating an average revenue value to the number of impressions associated with the advertisement as an indication of the effectiveness of the advertisement; and correlating an advertisement cost value to the number of impressions associated with the advertisement as an indication of the effectiveness of the advertisement.

15. The computer program product of claim 10, further comprising the digital processing apparatus.

16. A system for indicating the effectiveness of at least one advertisement on at least one site on a wide area computer network, comprising:

logic means for determining, by user identification, when user computers of the network gain impressions of the advertisement;

logic means for using user identifications to correlate impressions of the advertisement to post-impression transactional activity undertaken by the user computers as an indication of the effectiveness of the advertisements, and means for replacing the advertisement identification in the first network path name with the visitor identification to thereby render the second network path name.

17. The system of claim 16, wherein the logic means for determining and using further include logic means for receiving from the user a first network path name including an advertisement identification and returning to the user a second network path name including a visitor identification, the visitor identification establishing the user identification.

18. The system of claim 16, wherein the post-impression transactional activity includes at least one of: purchasing products or services advertised by the one or more advertisements; initiating a computer software download from the one or more sites on the network; completing a computer software download from the one or more sites on the network; and cancellations of purchases of products or services advertised by the one or more advertisements.

* * * * *